(12) United States Patent
Malakian et al.

(10) Patent No.: US 7,898,466 B1
(45) Date of Patent: Mar. 1, 2011

(54) OPTIMIZATION OF RADAR RESOURCES

(75) Inventors: Kourken Malakian, Mount Laurel, NJ (US); Tamara A. Vosbikian, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 12/329,991

(22) Filed: Dec. 8, 2008

(51) Int. Cl.
*G01S 13/66* (2006.01)

(52) U.S. Cl. .......................... 342/95; 342/97; 342/107; 342/133; 342/139; 342/195

(58) Field of Classification Search ............. 342/95–97, 342/107, 133, 139–141, 195
See application file for complete search history.

(56) References Cited

U.S. PATENT DOCUMENTS

| | | | |
|---|---|---|---|
| 4,148,026 A * | 4/1979 | Gendreu | 342/80 |
| 4,224,507 A * | 9/1980 | Gendreu | 235/412 |
| 4,783,744 A | 11/1988 | Yueh | |
| 5,424,742 A * | 6/1995 | Long et al. | 342/25 C |
| 5,430,445 A * | 7/1995 | Peregrim et al. | 342/25 C |
| 5,920,278 A * | 7/1999 | Tyler et al. | 342/33 |
| 6,714,155 B1 * | 3/2004 | Rose | 342/107 |
| 7,009,554 B1 | 3/2006 | Mookerjee et al. | |
| 7,026,980 B1 | 4/2006 | Mavroudakis et al. | |
| 7,180,443 B1 | 2/2007 | Mookerjee et al. | |
| 7,250,902 B2 * | 7/2007 | Manoogian et al. | 342/154 |
| 7,295,149 B1 | 11/2007 | Wolf | |
| 7,394,047 B1 | 7/2008 | Pedersen | |
| 7,511,252 B1 | 3/2009 | Pedersen et al. | |
| 7,663,528 B1 * | 2/2010 | Malakian et al. | 342/13 |
| 2007/0018882 A1 * | 1/2007 | Manoogian et al. | 342/80 |

* cited by examiner

*Primary Examiner*—John B Sotomayor
(74) *Attorney, Agent, or Firm*—Duane Morris LLP (57) ABSTRACT

The radar tracking or pulse refresh rate is calculated for a target. The refresh rate is selected which makes a sum equal to a predetermined fraction of the radar beamwidth, where the sum is the sum of the bias error and a multiplicative product. The multiplicative product is the product of the random error multiplied by a number associated with the containment probability of the total error.

12 Claims, 11 Drawing Sheets

$$\tau = T^{(1/5)} * \left( \frac{3n\sigma_m}{2A} \right)^{2/5} \qquad (1)$$

$$a = T^{(1/5)} * \left( \frac{3n\sigma_m}{2A} \right)^{2/5} \qquad (2)$$

$$b = a + T = T^{(1/5)} * \left( \frac{3n\sigma_m}{2A} \right)^{2/5} + T \qquad (3)$$

$$F(T) = n * \left( \frac{\left(1 - \left(\frac{a}{b}\right)^2\right)^{1/2}}{\left(\frac{a}{b}\right)^2} \right) * \sigma_m + \frac{AT^2}{2\left(\frac{T}{b}\right)^2} - kBW \qquad (4)$$

FIG. 5A $$F''(T) = \frac{1}{2} \left( \frac{1 - \left(\frac{a}{b}\right)^2}{\left(\frac{a}{b}\right)^2} \right) * \frac{\left(\frac{a}{b}\right)^2 * \frac{d\left(1 - \left(\frac{a}{b}\right)^2\right)}{dt} \cdot \frac{d\left(\frac{a}{b}\right)^2}{dt} * \left(1 - \left(\frac{a}{b}\right)^2\right)}{\left(\frac{a}{b}\right)^4} + \frac{\frac{d(AT^2)}{dt} * \left(\frac{2T}{b}\right)^2 - \frac{d\left(2\left(\frac{T}{b}\right)^2\right)}{dt} * AT^2}{4\left(\frac{T}{b}\right)^4} \quad (5)$$

$$F''(T) = \frac{1}{2} * \frac{\left( \frac{1 - \left(\frac{a}{b}\right)^2}{\left(\frac{a}{b}\right)^2} \right) - 2\left(\frac{a}{b}\right) * \left[ \frac{d\left(\frac{a}{b}\right)}{dt} * \left(\frac{a}{b}\right)^2 - 2\left(\frac{a}{b}\right) * \frac{d\left(\frac{a}{b}\right)}{dt} * \left(1 - \left(\frac{a}{b}\right)^2\right) \right]}{\left(\frac{a}{b}\right)^4} + \frac{\frac{d(AT^2)}{dt} * 2\left(\frac{T}{b}\right)^2 - 4\left(\frac{T}{b}\right) * \frac{d\left(\frac{T}{b}\right)}{dt} * AT^2}{\left(2\left(\frac{T}{b}\right)^2\right)^2} \quad (6)$$

$$F''(T) = \frac{1}{2} * \frac{\left( \frac{1 - \left(\frac{a}{b}\right)^2}{\left(\frac{a}{b}\right)^2} \right) - \left(\frac{1}{2}\right) * D * \left(\frac{a}{b}\right)^2 + D * \left(1 - \left(\frac{a}{b}\right)^2\right)}{\left(\frac{a}{b}\right)^4} + \frac{(2*A*T) * 2\left(\frac{T}{b}\right)^2 - 4\left(\frac{T}{b}\right) * E * AT^2}{\left(2\left(\frac{T}{b}\right)^2\right)^2} \quad (7)$$

*FIG. 5B*

$$D = -2 \frac{\left(\left(\frac{1}{5}T^{(-4/5)}\left(\frac{3n\sigma_m}{2A}\right)^{2/5}\right) * \left(\left(\frac{1}{5}T^{(-4/5)}\left(\frac{3n\sigma_m}{2A}\right)^{2/5} + T\right) * \left(T^{(1/5)} * \left(\frac{3n\sigma_m}{2A}\right)^{2/5} + 1\right) - \left(\frac{1}{5}T^{(-4/5)}\left(\frac{3n\sigma_m}{2A}\right)^{2/5}\right)\right)}{\left(\frac{1}{5}T^{(-4/5)}\left(\frac{3n\sigma_m}{2A}\right)^{2/5} + T\right)} * \left(T^{(1/5)} * \left(\frac{3n\sigma_m}{2A}\right)^{2/5}\right)$$
(7.1)

$$E = \frac{\left(T^{(1/5)} * \left(\frac{3n\sigma_m}{2A}\right)^{2/5} + T\right) - \left(\frac{1}{5}T^{(-4/5)}\left(\frac{3n\sigma_m}{2A}\right)^{2/5}\right)\left(T^{(1/5)}\left(\frac{3n\sigma_m}{2A}\right)^{2/5} + 1\right) * T}{\left(T^{(1/5)} * \left(\frac{3n\sigma_m}{2A}\right)^{2/5} + T\right)^2}$$
(7.2)

FIG. 5C $$T_{n+1} = T_n - \left(\frac{F(T)_n}{F'(T)_n}\right) \qquad (8)$$

$$n* \sqrt{\frac{1-\left(\frac{a}{b}\right)^2}{1-\left(1-\left(\frac{a}{b}\right)^2\right)}} *\sigma_m + \frac{AT^2}{2\left(\frac{T}{b}\right)^2} = kBW \qquad (10)$$

FIG. 5D $$n* \underbrace{\left[\frac{1-\left(\dfrac{T^{(1/5)}*\left(\dfrac{3n\sigma_m}{2A}\right)^{2/5}}{T^{(1/5)}*\left(\dfrac{3n\sigma_m}{2A}\right)^{2/5}+T}\right)^2}{1-\left(1-\left(\dfrac{T^{(1/5)}*\left(\dfrac{3n\sigma_m}{2A}\right)^{2/5}}{T^{(1/5)}*\left(\dfrac{3n\sigma_m}{2A}\right)^{2/5}+T}\right)^2\right)}*\sigma_m\right.} + \underbrace{\dfrac{AT^2}{2\left(\dfrac{T}{T^{(1/5)}*\left(\dfrac{3n\sigma_m}{2A}\right)^{2/5}+T}\right)^2}}_{} = kBW \quad (9)$$

THIS IS THE n     THIS IS THE σ     THIS IS THE b n     σ     + b

| T | TOTAL ERROR BUDGET | FULL ALLOCATION | DIFFERENCE BETWEEN THE TOTAL ERROR BUDGET AND THE FULL ALLOCATION | RANGE | # OF G's |
|---|---|---|---|---|---|
| 1.8487 | 12.8767 | 13.0897 | -3.1513000000 | 130 | 5 |
| 1.9057 | 13.1509 | 13.0897 | 0.0569520000 | 130 | 5 |
| 1.8894 | 13.0726 | 13.0897 | -0.0162640000 | 130 | 5 |
| 1.894 | 13.0946 | 13.0897 | 0.0045723000 | 130 | 5 |
| 1.8927 | 13.0884 | 13.0897 | -0.0012912000 | 130 | 5 |
| 1.8931 | 13.0901 | 13.0897 | 0.0003641900 | 130 | 5 |
| 1.893 | 13.0896 | 13.0897 | -0.0001027600 | 130 | 5 |
| 1.893 | 13.0898 | 13.0897 | 0.0000289890 | 130 | 5 |
| 1.893 | 13.0897 | 13.0897 | -0.0000081787 | 130 | 5 |

FIG. 7

OPTIMIZATION OF RADAR RESOURCES

This invention was made with Government Support under Contract No. N00024-03-C-6110 awarded by the Department of the Navy. The Government has certain rights in this invention.

BACKGROUND OF THE INVENTION

Multifunction, multiple target radar systems are required to perform search and target track functions, and may also be required to engage in electronic countermeasures, and may perform other functions. The number of targets may be very large in a worst-case scenario. Large amounts of electromagnetic energy are required to search for and track these multiple targets, some of which may be at considerable distances, and large amounts of signal processing capability are required to perform radar functions, and to sense and track the large numbers of targets.

It is important to control the scheduling of electromagnetic transmissions so that the operating power does not exceed that of which the radar is capable. Put another way, suboptimal energy or power resource control may reduce the ability to properly search for and track the targets. Similarly, the processing must be sufficient to perform all the radar-related tasks such as pulse duration control, target return pulse correlation, and also to perform scan-to-scan correlation and target tracking.

Figure 1:
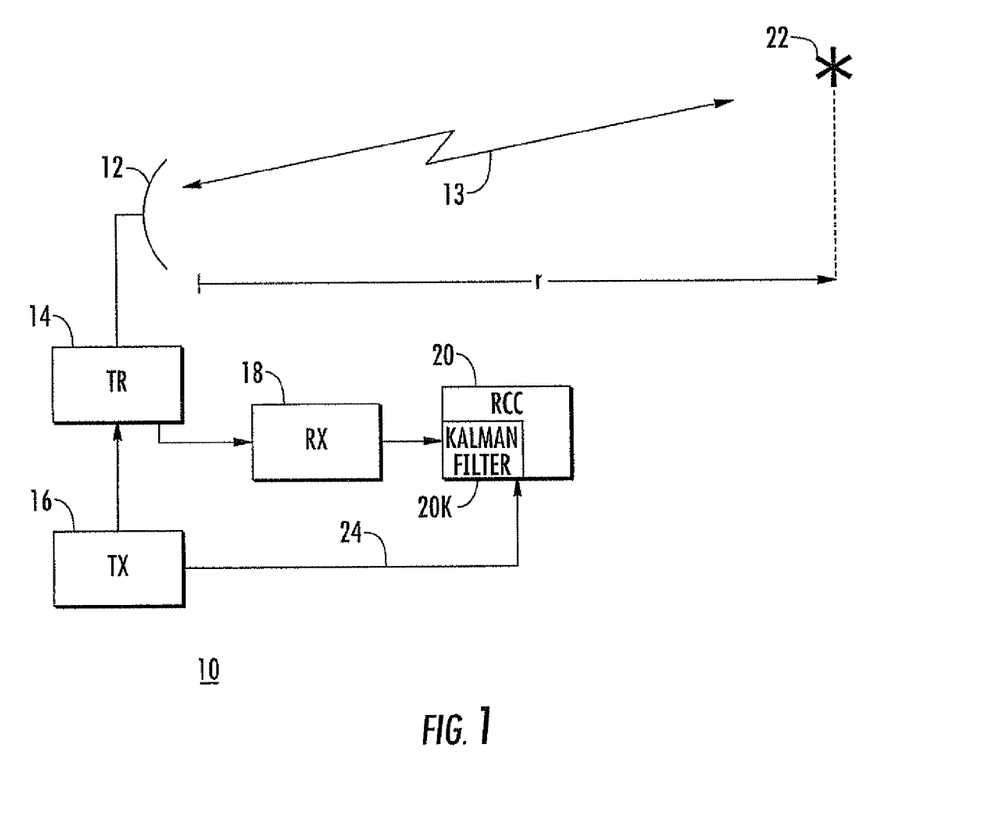
FIG. 1 is a simplified block diagram of a prior-art radar system.

FIG. 1 is a simplified block diagram of a prior-art multifunction radar system 10. In FIG. 1, a radar antenna illustrated as 12 is coupled to a transmit/receive (T/R) arrangement illustrated as a block 14. A transmitter illustrated as a block 16 provides pulses to the antenna 12 by way of T/R 14 under control of a radar control computer (RCC) or processor 20. A well known Kalman filter 20k is illustrated as being associated with radar control processor 20. Electromagnetic signals are transmitted toward, and returned from, a representative target 22, one of potentially many such targets. The electromagnetic transmissions and returns are illustrated as a conventional lightning bolt symbol 13. The return signals are routed by T/R 14 to a radar receiver (RX) illustrated as a block 18. Block 18 performs well-known functions, including analog signal processing and conversion of the signals to digital form.

The processed and digitized radar return signals from radar receiver 18 are applied to a radar control computer (RCC) 20, which performs the tasks of scheduling transmissions from radar transmitter 16, and commanding the scheduled transmissions by means of commands applied over a path 24. The radar control computer also processes the received signals to minimize the signal-to-noise ratio and enhance detection, it may perform jamming countermeasures, and has many other very important tasks in signal processing. Once targets are identified, the radar control computer also attempts to make sense of the moment-to-moment target environment, including such tasks as controlling the radar searching of a volume for previously unknown targets, identifying targets in the presence of noise, correlating new positions of targets with previous positions to thereby define target tracks, and the like.

Among the tasks of the radar control computer 20 of FIG. 1 are those of directing an antenna beam (or beams in the case of multibeam antennas) toward each target during target tracking. It is important, when a target location is to be updated, that an antenna beam be directed toward the target's approximate position so that electromagnetic energy can be directed toward it, and so the reflections of energy from the target can be received for processing. If the target does not lie within an antenna beam, its new position will not be sensed, and tracking may fail. The beam direction for the next scheduled transmission is also sent from the radar control computer 20 of FIG. 1 to the transmitter 16 (and its associated antenna 12) to select the beam direction for each radar transmission.

Figure 2:
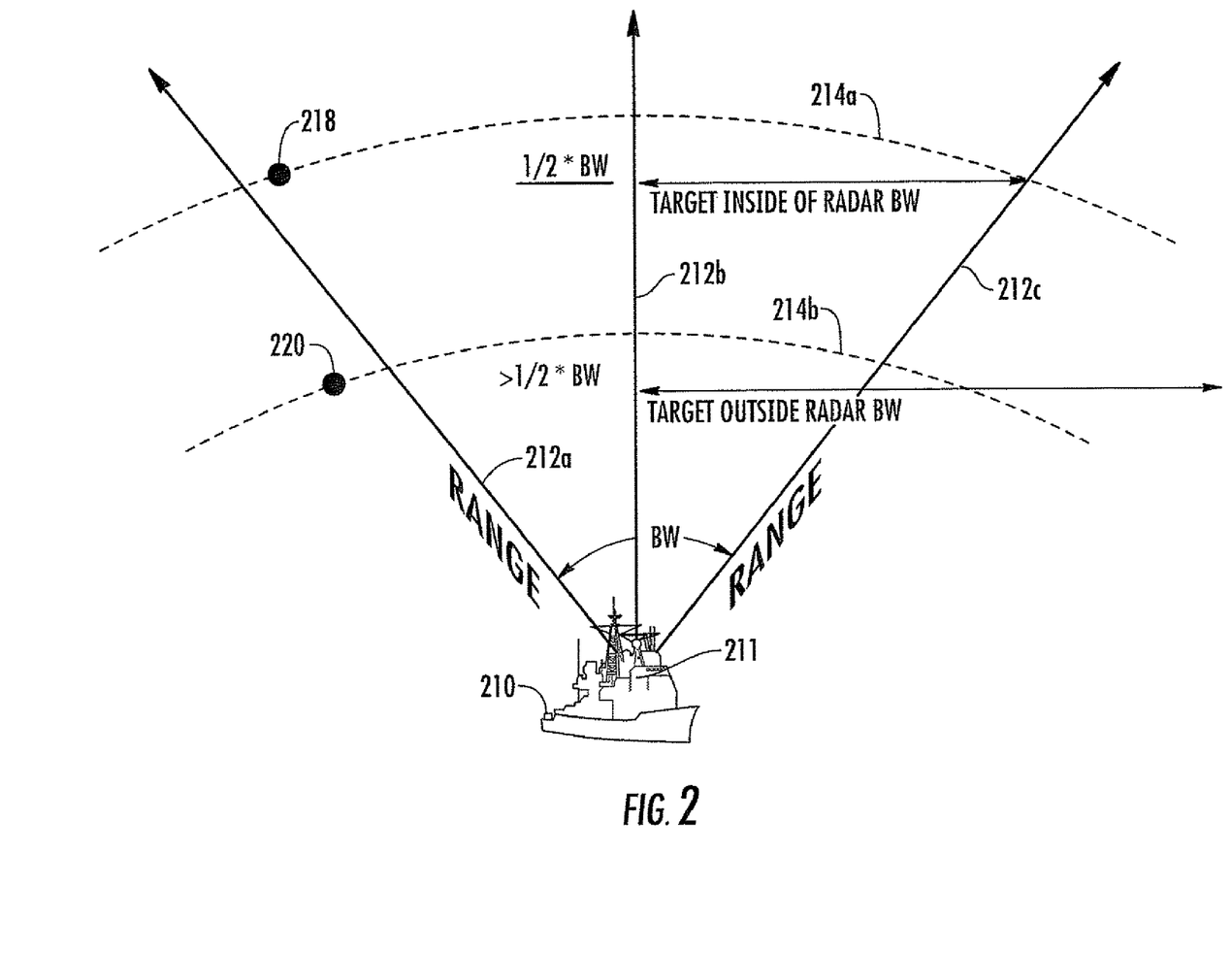
FIG. 2 is a simplified representation of antenna beamwidth in the radar of FIG. 1, showing possible target locations relative to the antenna beamwidth, to show potential detection or sensing of the target when within the beam and why the target may not be sensed when without the beam.

FIG. 2 is a simplified diagram illustrating possible target locations within a radar beam. In FIG. 2, a radar system (not illustrated) is mounted on a ship 210 at an origin 211, at the intersection of beam-width-limit lines 212a and 212c. Beamwidth limit lines 212a and 212c are centered about a beam center line 212b. Different positions along lines 212a, 212b, and 212c represent different ranges from the origin 211, which is the location of the radar. Two different ranges are illustrated by dash line, namely ranges 214a and 214b. The included angle BW subtended between range lines 212a and 212c represents the beamwidth of the radar beam at some reference response or power level from the peak response or power level, such as the half-power level (−3 dB) as known in the art. At the range represented by dash line 214a of FIG. 2, the target is represented as being at a position indicated as 218. The location 218 lies within the angle BW, so that the target will receive incident electromagnetic energy and reflect the energy in an amount that will result in detection of the target after the signal processing performed in the radar control computer 20 of FIG. 1. At the range represented by dash line 214b of FIG. 2, the location of the target is illustrated as 220. Location 220 is without the angle BW subtended between the beamwidth limit lines 212a and 212c.

Improved or alternative radar arrangements are desired.

SUMMARY OF THE INVENTION

A method according to an aspect of the invention is for determining the timing of radar tracking pulses in a pulsed radar system operable in at least a tracking mode, where the radar beamwidth is known or predetermined. The method comprises the steps of determining the radar range of the target and the angle accuracy in the tracking mode. The bias error attributable to maneuver of the sensed target, random error in sensed target angle, and probability of containment of the cumulative or total error are determined. From the bias error, random error, and probability of containment, that value of tracking refresh rate for the sensed target is determined which makes the sum of (a) the bias error and (b) the product of the random error multiplied by a number associated with the containment probability of the total error (c) equal to a predetermined fraction of the radar beamwidth. In a particular mode of this method, the predetermined fraction of the radar beamwidth is one-half.

A method according to another aspect of the invention is for selection of the timing between successive tracking pulses in a radar system which is tracking, with the aid of a Kalman filter, a target having acceleration A and at a range r, where the radar system has a beamwidth BW at a given relative fractional power level k, and standard deviation of the measurement error $\sigma_m$. The method comprises the steps of calculating the Kalman filter lag time $\tau$ which minimizes target velocity, and determining a nonlinear equation F(T) and its derivative F'(T) with respect to time T. Using an iterative Newton-Raphson numeric method, the value of radar tracking pulse time interval T is determined to within a predetermined accuracy. Radar tracking pulses are transmitted toward the target at the calculated value of radar tracking pulse time interval T. In a particular mode of this method, the step of calculating the Kalman filter lag time $\tau$ which minimizes target velocity comprises the step of calculating $$\tau = T^{(\frac{1}{5})} * \left(\frac{3n\sigma_m}{2A}\right)^{(\frac{2}{5})} \text{ where:}$$

where:
 n is a number associated with the probability of containment;
 $\sigma_m$ is random error in sensed or measured target angle;
 A is the target acceleration; and
 * represents multiplication.

In another particular mode of this method,
the step of determining a nonlinear equation F(T) and its derivative F'(T) with respect to T includes the steps (a) of calculating:

$$F(T) = n * \left(\frac{\left(1 - \left(\frac{a}{b}\right)^2\right)}{\left(\frac{a}{b}\right)^2}\right)^{1/2} * \sigma_m + \frac{AT^2}{2\left(\frac{T}{b}\right)^2} - kBW = 0 \text{ where:}$$

$$a = T^{\frac{1}{5}} * \left(\frac{3n\sigma_m}{2A}\right)^{\frac{2}{5}}$$

and $$b = a + T = T^{(1/5)} * \left(\frac{3n\sigma_m}{2A}\right)^{2/5} + T$$

(b) calculating F'(T); and (c) iteratively applying the Newton-Raphson method for determining the value of radar tracking pulse time T to within a desired accuracy.

DESCRIPTION OF THE INVENTION

One of the functions performed by radar control computer (RCC) 20 of FIG. 1 is scheduling of the refresh rate of pulse generation for the tracking of previously sensed targets. A needed refresh rate is established in the prior art arrangement, which is a refresh rate that assures that the target is kept in track.

Figure 3:
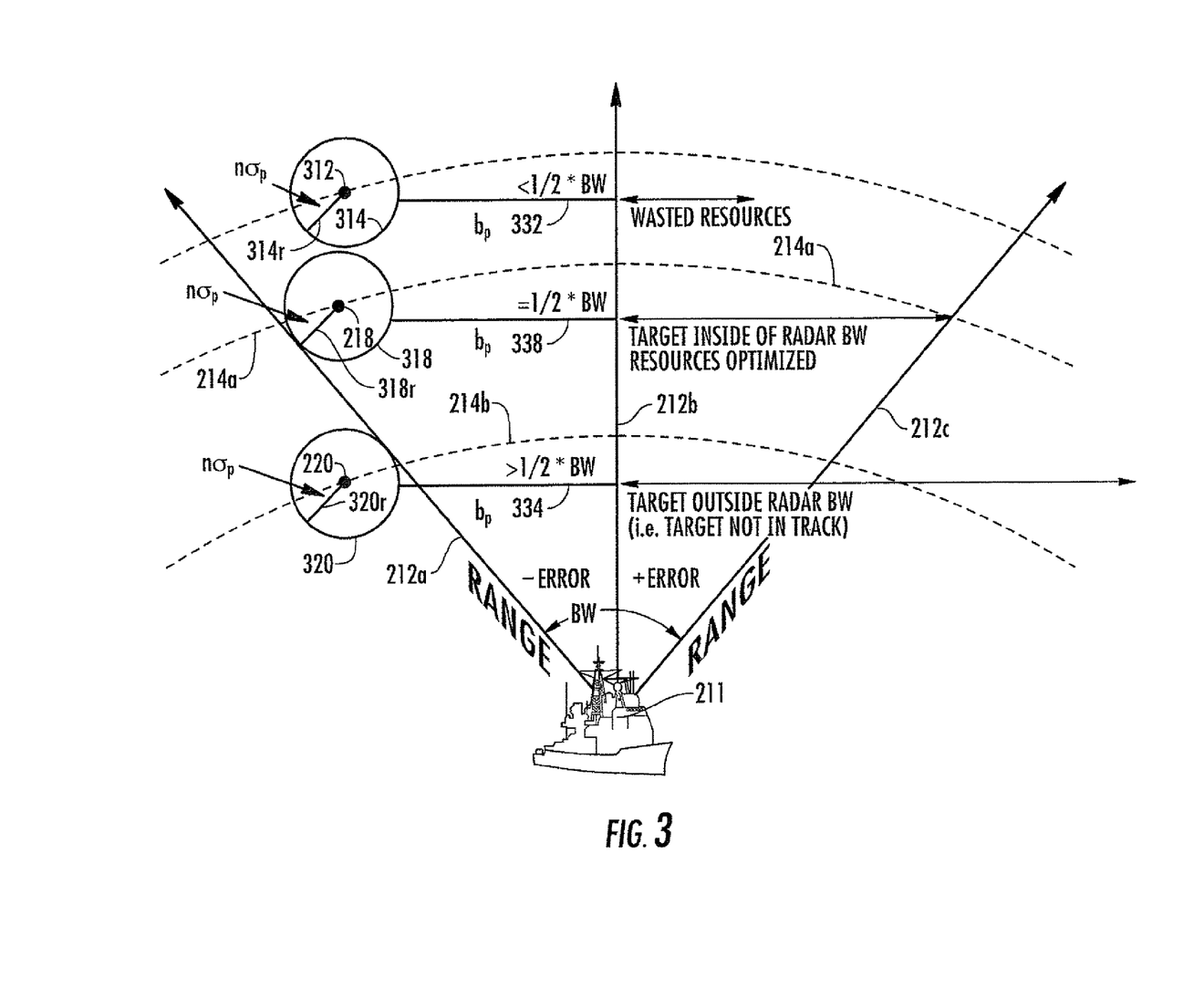
FIG. 3 is similar to FIG. 2, but includes circles representing the random variation of the target locations about nominal locations, and also showing target maneuver possibilities.

In the prior-art arrangement of FIG. 1, the radar control computer 20 establishes the radar refresh rate or interval. The refresh rate is the rate at which an antenna beam must be directed toward the target in order to keep it in track. The prior-art arrangement attempts to provide refresh beams at a rate which is guaranteed to keep the target in track. It has been found that the prior-art arrangement for establishing the refresh rate may waste radar energy or power resources, and it turns out that it may also waste radar processor capacity. This may be understood by reference to FIG. 3. FIG. 3 is similar to FIG. 2, and corresponding elements are designated by like reference alphanumerics. In FIG. 3, target locations 218 and 220 are surrounded by circles 318 and 320, respectively, which lie at radii 318*r* and 320*r* from the target locations, respectively. The radii 318*r* and 320*r* represent the random errors in the target location, designated by n$\sigma_p$, where the subscript p represents the "predicted" angle error in the same units as the beamwidth (possibly degrees or radians), and number n represents the containment probability of the total error. That is, n represents the probability that the target is found within the beam. It will be clear that, notwithstanding the possible random variations in target position represented by the radius 320*r* of circle 320 about location 220 in FIG. 3, there is no possibility of detecting the target, as the circle 320 lies outside of −3 dB line 212*a* or at >½BW. In theory, a single failure to sense during a dwell can result in loss of track. Multiple failures to sense will certainly result in loss of track. On the other hand, the range of possible random variations in target position represented by the radius 318*r* of circle 318 assures that the target will be sensed, as the circle 318 lies totally within the beamwidth BW or =½BW. In this scenario, the range of possible locations represented by circle 318 lies just within the beamwidth, and any increase in the random variation would result in a possibility of the target not being sensed or detected. In effect, all of the beamwidth is being used in the scenario involving nominal target location 218, and the resource usage may be viewed as being optimum. The condition represented by nominal target location 312 and random variation circle 314 at a radius 314*r* from location 312 is one in which the range of possible variations in position of the target lies within the beamwidth BW, so the target is assured of being sensed. However, the random variation circle 314 is not tangent to the −3 dB line 212*a*, so some of the beamwidth in the scenario of nominal target location 312 is not used, which is a suboptimal use of resources. That is, a portion of the beamwidth BW in the case of nominal location 312 and random variation circle 314 is not utilized for target location, so represents wasted energy and processing resources. As mentioned, processing and energy resources must be conserved in operation of a multifunction radar in order to assure that sufficient resources are available to fulfill all the required tasks. It will be understood that in a military context, failure of the radar system to detect a target during search of loss of track of a previously identified target may be disastrous. Consequently, the husbanding of energy and computation resources is an important aspect of radar operation.

According to an aspect of the invention, the radar control processor (RCC) 20 of FIG. 1 controls the transmitter transmission refresh rate in such a fashion that the sum of the random errors in target location plus the target maneuver bias completely fills or consumes a particular antenna beamwidth, such as the 3 dB beamwidth. The random errors in the target location have been explained in conjunction with the discussion of FIG. 3. In FIG. 3, the target maneuver bias for each nominal target location is illustrated as an angle from the antenna beam maximum. In FIG. 3, nominal target location 218 has the circle of random location errors 318 tangent to the beamwidth edge 212a, which means that the circle is displaced from beam centerline 212b by an amount equal to the target maneuver bias $b_p$, illustrated as a line 338. The circle 314 representing the random location errors around nominal target location 312 is displaced by line 332 from beam centerline 212b. For completeness, random location variation circle 320 about nominal target location 220 is displaced by line 334 from the antenna beam centerline 212b. In optimal estimation using a Kalman filter, the filter experiences or incurs bias if the object motion does not conform to the kinematic motion prescribed by the filter. Since enemy targets are not cooperative in telling us their motion, they will therefore incur a deviation from the kinematic equations prescribed in the filter. As such, the filter will incur bias when those deviations occur. In our problem, that deviation is described by the multiples of the force of gravity (number of G's) used for the acceleration. Line 334 of FIG. 3 represents the predicted filter bias due to target maneuver (in the same units as the beamwidth).

Figure 4:
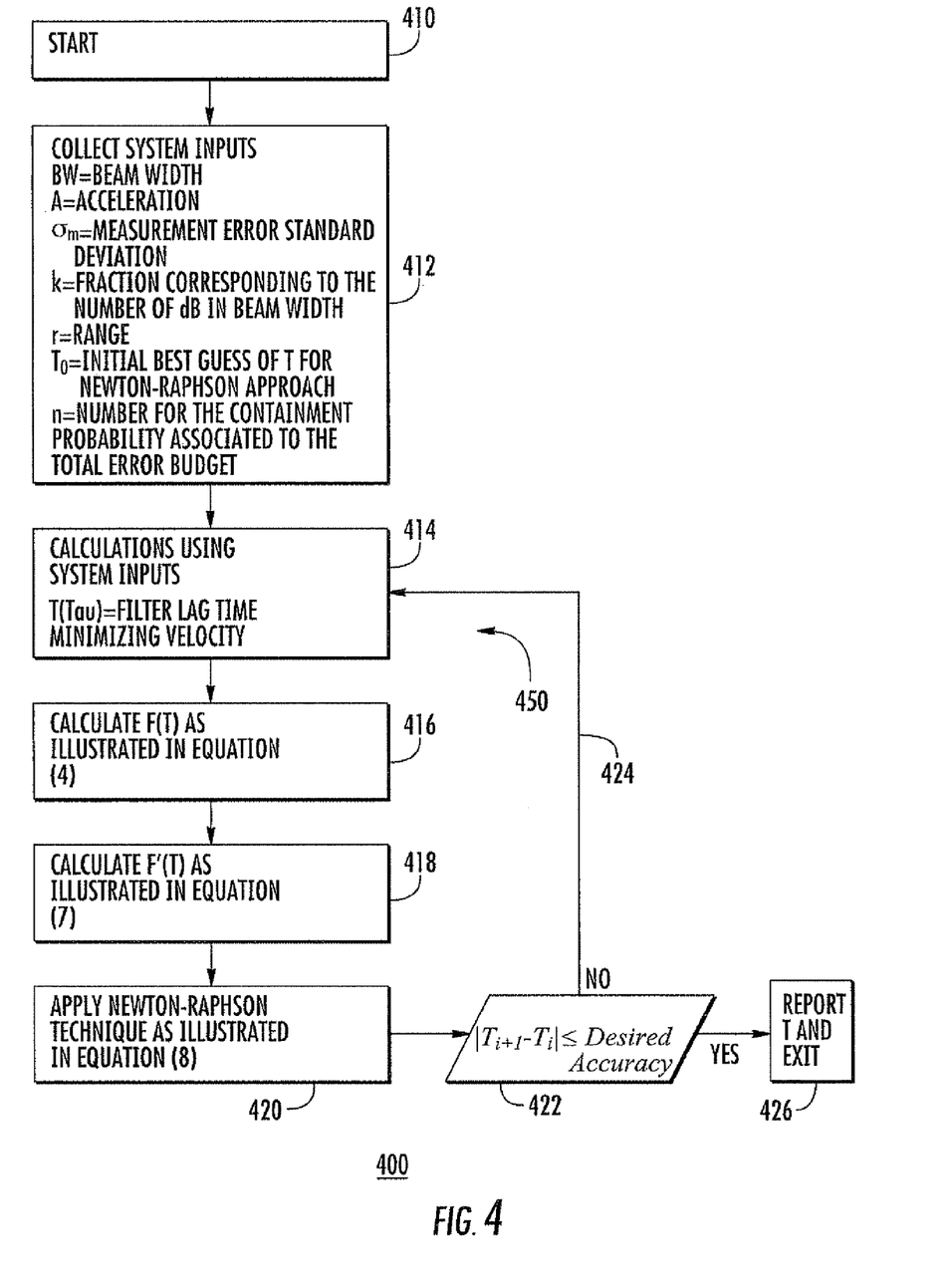
FIG. 4 is a simplified logic or control flow chart or diagram illustrating some computer processes according to an aspect of the invention, which processes are performed by the radar processor of FIG. 1.

FIG. 4 is a simplified logic or control flow chart or diagram 400 illustrating steps of processing which may be performed in the radar system of FIG. 1 in accordance with an aspect of the invention. In FIG. 4, the logic 400 begins at a START block 410, and flows to a block 412. Block 412 represents the collecting of data as inputs to the flow 400. The data which is or are collected includes the radar antenna beamwidth (BW), which ordinarily will have a single nominal value, and a fraction (k), and n, which fraction represents the number of decibels of attenuation between the beam-peak intensity and the intensity at the beam edge. The value of k will ordinarily be ½, which is the power ratio representing a "3 dB" beamwidth. Other data which is or are collected in association with block 412 includes the target range (r) and acceleration (A). The value of standard deviation of the measurement error ($\sigma_m$) is also imported, together with a best-guess $T_0$ of the ultimate radar revisit time T.

Figure 5A:
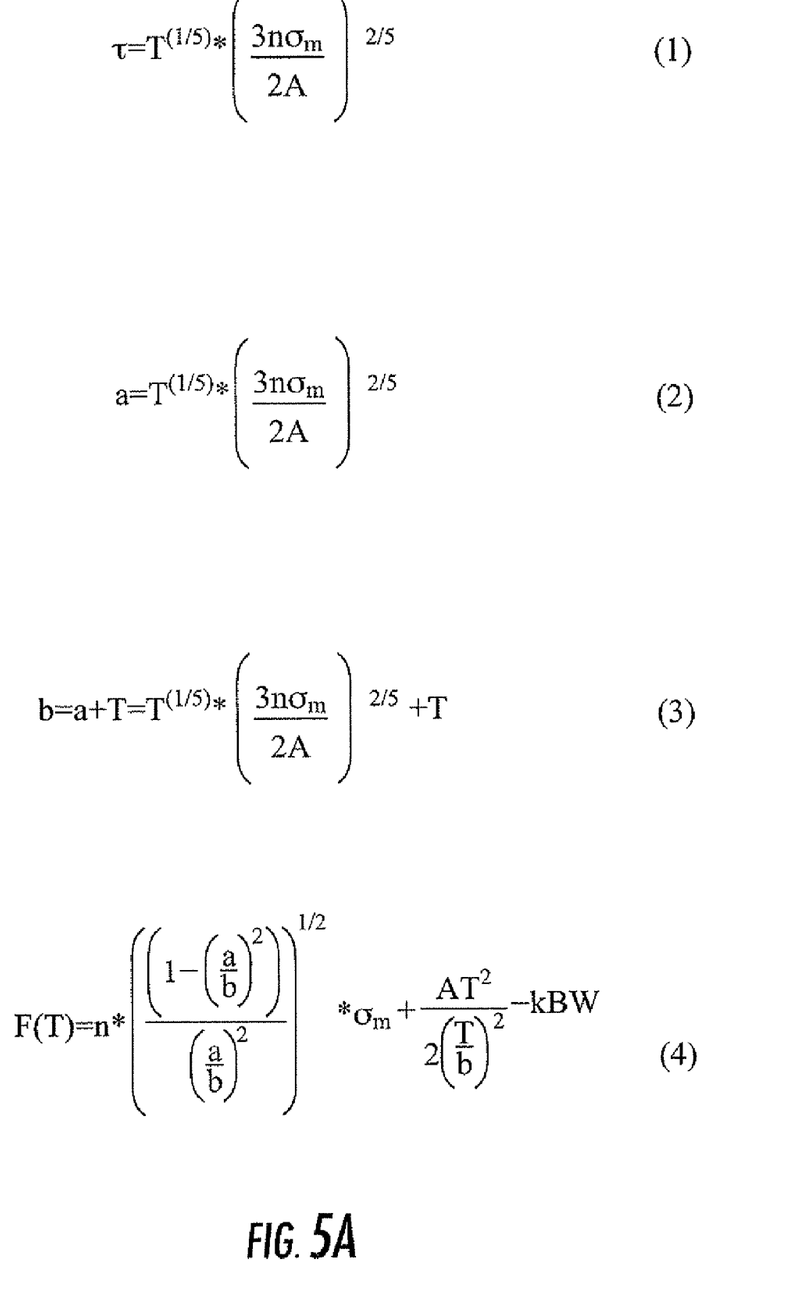
FIGS. 5A, 5B, 5C, 5D, and 5E set forth certain equations useful in understanding the invention.

From block 412 of FIG. 4, the logic 400 flows to a block 414, in which the calculations are begun to determine the duration (T) of the longest intervals between updates of targets in the track mode consistent with maintaining track. Block 414 represents further calculations, including the calculation of the Kalman filter time lag or propagation delay ($\tau$) which minimizes target velocity. That is, the value is computed of the time or propagation delay ($\tau$) associated with the Kalman filters which are used to calculate the filter position and velocity gains. The equation required to determine the time delay is illustrated as equation (1) in FIG. 5A, where the asterisk (*) represents ordinary multiplication. The calculation of time or propagation delay ($\tau$) in block 414 during the first iteration through the logic 400 uses the initial best-guess $T_0$ of the ultimate radar revisit time T, and during later iterations uses the most recently calculated time T.

From block 414 of FIG. 4, the logic 400 flows to a block 416. Block 416 represents calculation of a nonlinear equation F(T), set forth as equation (4) in FIG. 5A. The constituent terms "a" and "b" of equation (4) are set forth as equations (2) and (3), respectively, in FIG. 5A.

Figure 5B:
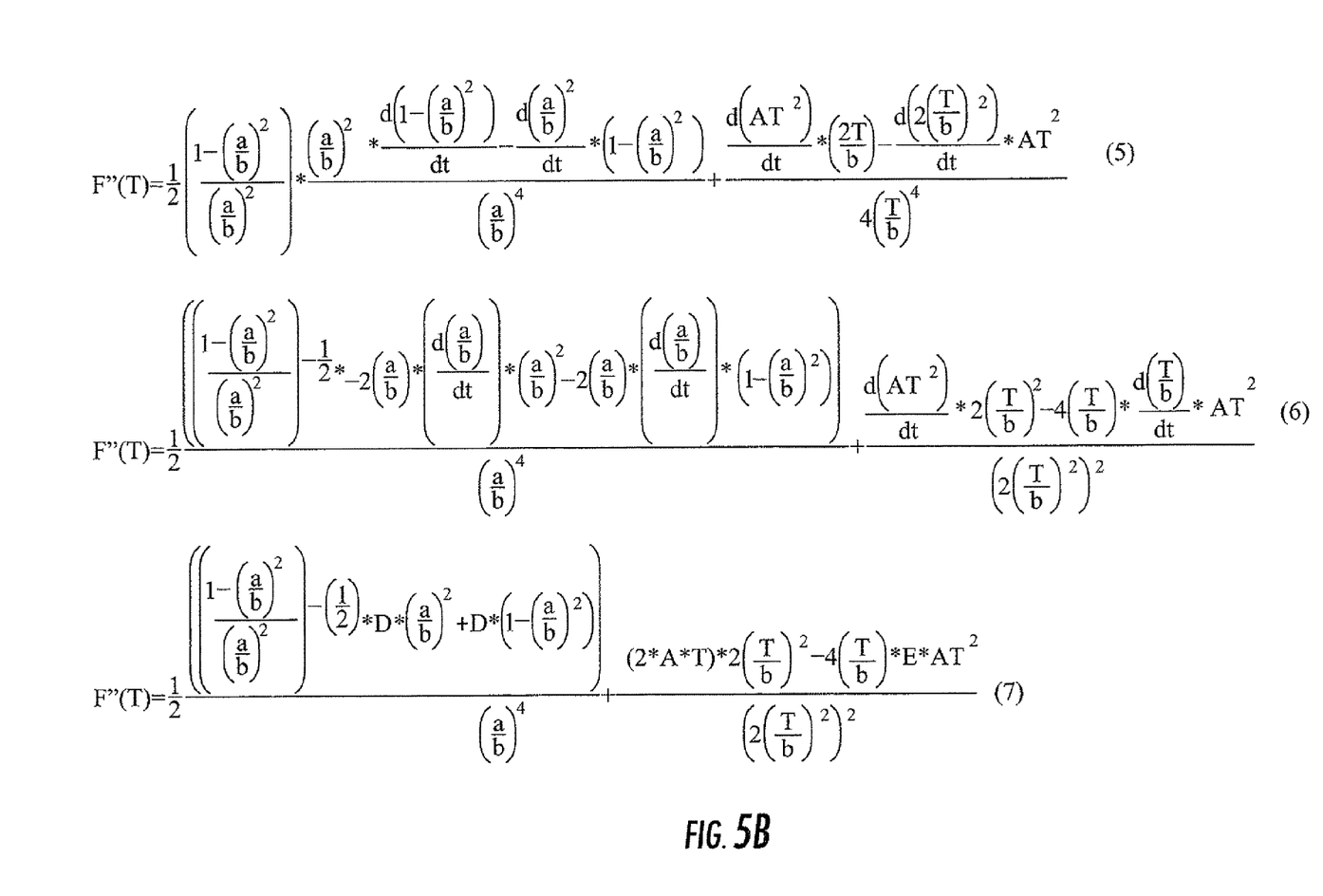
Figure 5C:
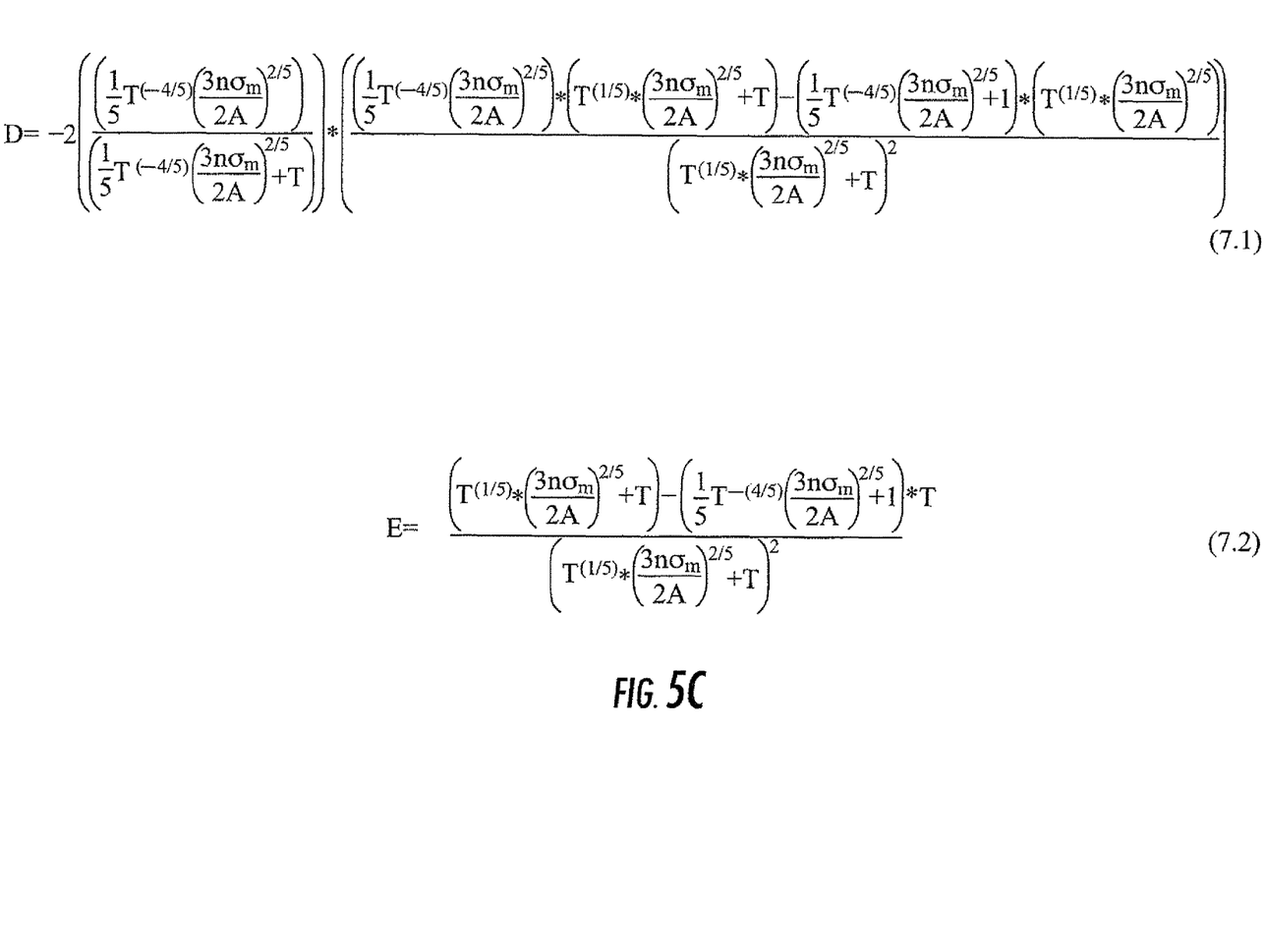

From block 416 of FIG. 4, the logic 400 flows to a block 418. Block 418 represents a calculation of F'(T), where the prime (') notation represents a mathematical derivative with respect to T. Derivative F'(T) is calculated in accordance with equation (5) of FIG. 5B. Equation (5) can be rewritten in the form expressed in equation (6). Equation (6), in turn, can be simplified into the form of equation (7) of FIG. 5B, where D is given by equation 7.1 of FIGS. 5C and E is given by equation 7.2 of FIG. 5C.

According to an aspect of the invention, the value of T is extracted from nonlinear equation F(T) by use of the iterative Newton-Raphson numeric technique, represented by block 420 of FIG. 4 in conjunction with block 422 and path 424, together defining an iterative loop 450. The Newton-Raphson technique or method can be expressed in the form of equation (8) of FIG. 5D. This method is used to solve for T, F(T), and F'(T) until the difference between $T_{n+1}$ and $T_n$ has an absolute value of less than some small value, which may take the value 0.00001 (or some other small number). Thus, the currently calculated value of T is applied to a decision block illustrated as 422. Decision block 422 determines the absolute value $|T_{i+1} - T_i|$ and compares it with the desired accuracy, $|T_{i+1} - T_i| \leq 0.00001$. The logic leaves decision block 422 by the NO output and returns by way of a logic path 424 to block 414 if the difference is larger than the minimum value, to thereby begin another iteration around iteration loop 450. In this further iteration, the starting value of T will be closer than the previous starting value. The logic continues to loop around blocks 414, 416, 418, 420, and 422 until the difference between the value of T at the last iteration and at the current iteration is less than the minimum value. When the difference is less than the minimum value, the logic 400 leaves decision block 422 by the YES output, and flows to a block 426. When the difference is less than 0.00001 (or some other selected difference), the value of T is deemed to be known. Block 426 represents the reporting of the current value of T to the radar processor, and the exiting of the logic 400.

Figure 5D:
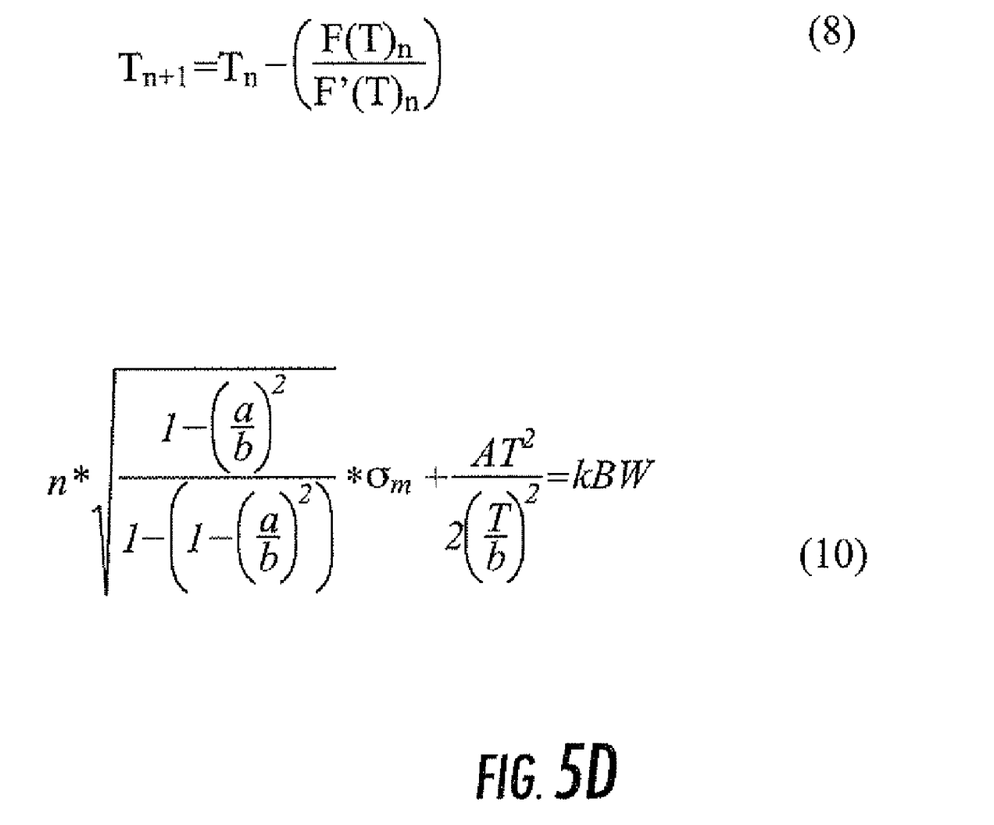
Figure 5E:
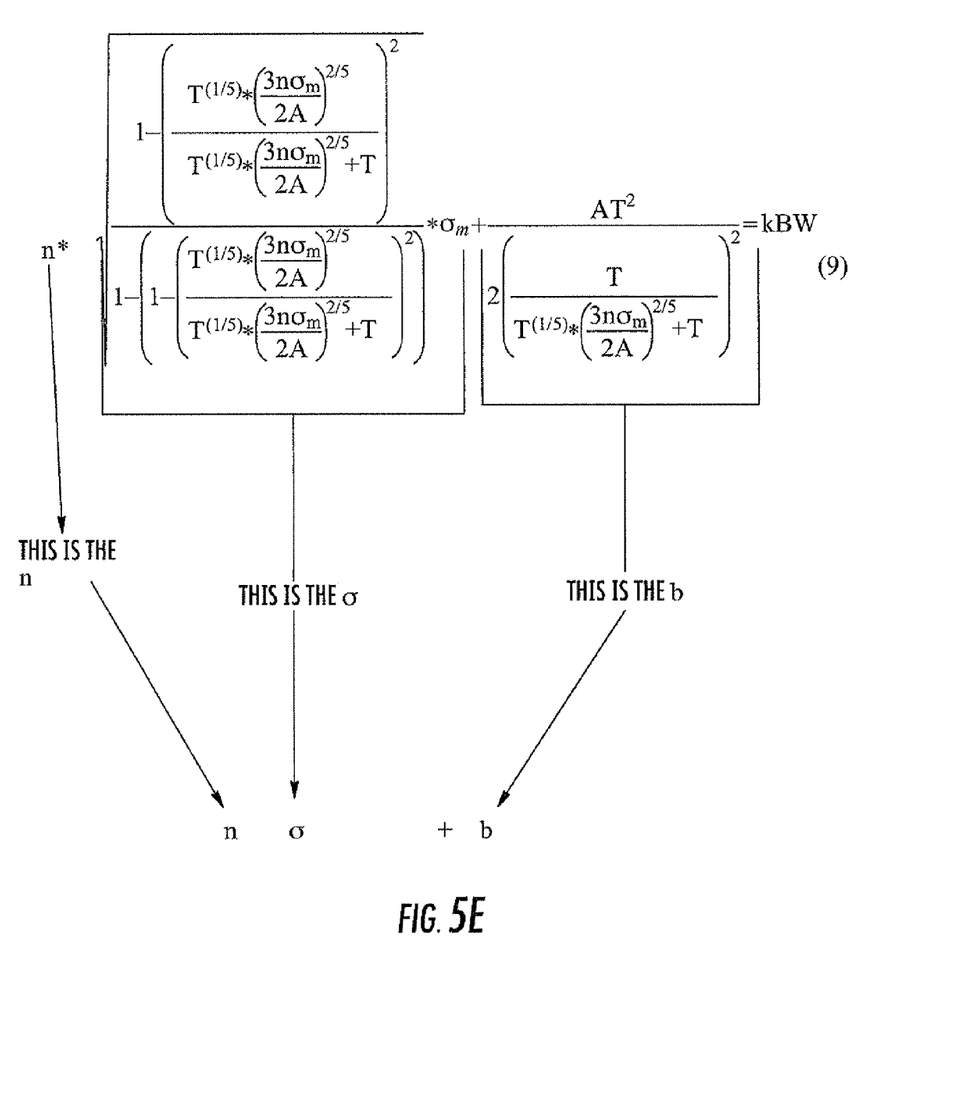

While not necessary in on-line calculation of the value of track update time T, it is possible to verify the value. This is done by taking the final calculated $T_{n+1}$, and substituting this value for T in both $F(T)_n$ and $F'(T)_n$ in equation (8) of FIG. 5D, and computing $n\sigma + b = kBW$ as set forth in equation (9) of FIG. 5E to verify that the left side of the equation is equal to kBW. The terms or portions of equation (9) corresponding to n, $\sigma$, and b are identified in FIG. 5E. Equation (10) of FIG. 5D is a simplification of equation (9).

The update rate (T) relates to the error budget such that the smaller the error budget, the smaller T will be, which means more frequent revisits to the target, and therefore the greater the radar resource expenditure. Conversely, the larger the error budget, the larger the update rate (T), which translates to less revisits to the target, therefore, conserving radar resources.

Figure 6:
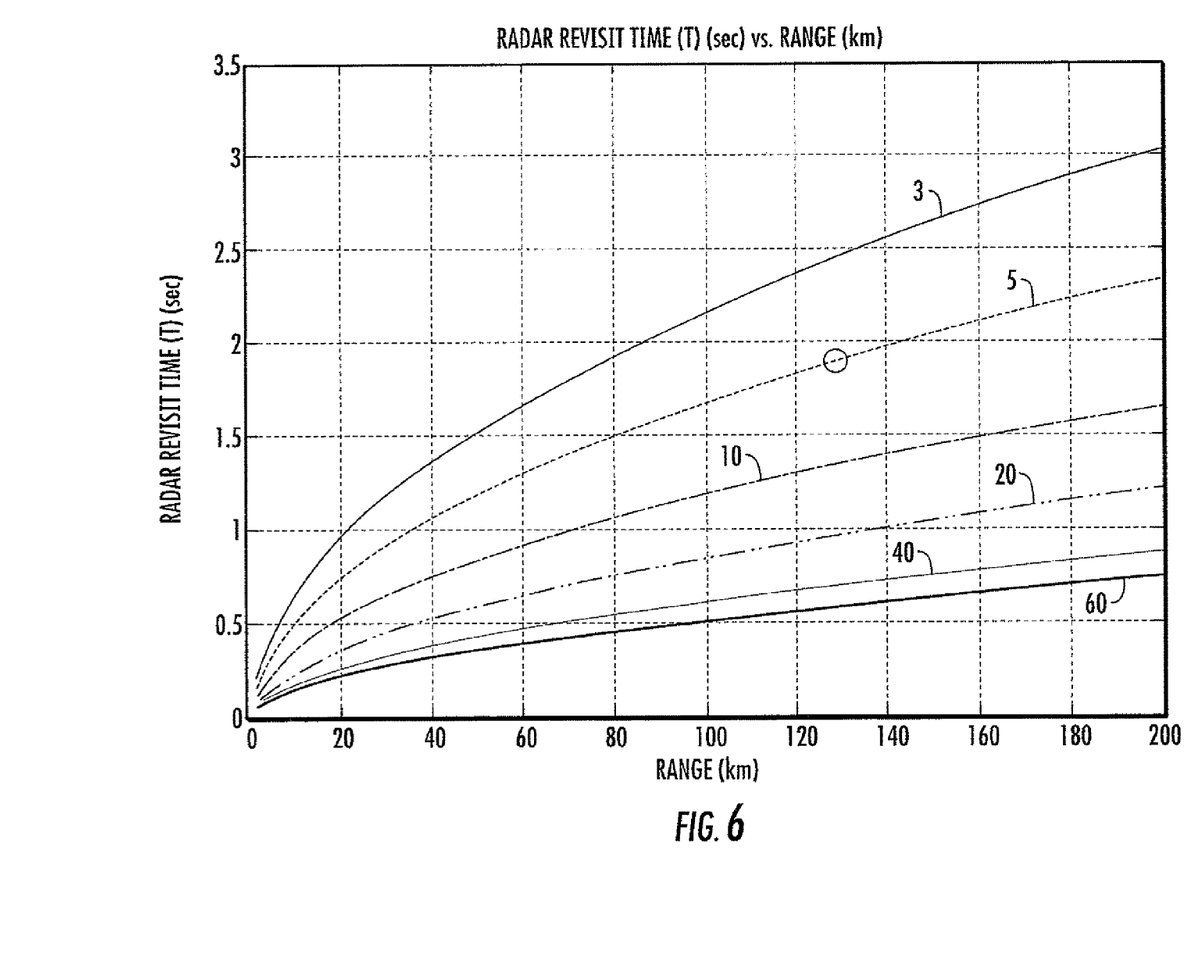
FIG. 6 plots radar revisit time versus target range with target acceleration as a parameter.

The parametric plots of FIG. 6 are generated by selecting an initial estimated update time $T_0$ which exceeds any likely value. It turns out that the initial value of T does not affect the calculated update time, but may affect the number of iterations which are required to reach the desired result. More particularly, as a result of the existence and uniqueness theorems associated to the Newton-Raphson method, convergence is always to the same value. By virtue of the function we are solving, it satisfies the existence of a solution and a convergence of an iterative process to a solution and that solution is a unique solution.

FIG. 6 plots the radar revisit time in seconds as a function of range in kilometers (km) for a case in which the 3 dB beamwidth is 1.5° and beamwidth value k is 0.5, and with the acceleration of the target, measured in multiples of gravity (G), as a parameter selected from the set {3, 5, 10, 20, 40, 60}. To perform the calculations, the initial value of $T_0$ is selected to be 15 seconds, which as mentioned makes no difference in the value of the result. The standard deviation $\sigma_m$ of the measurement error is selected to be r*3 milliradians. The number (n) that associates to the containment probability total error is 2. The desired accuracy is set to 0.00001.

Figure 7:
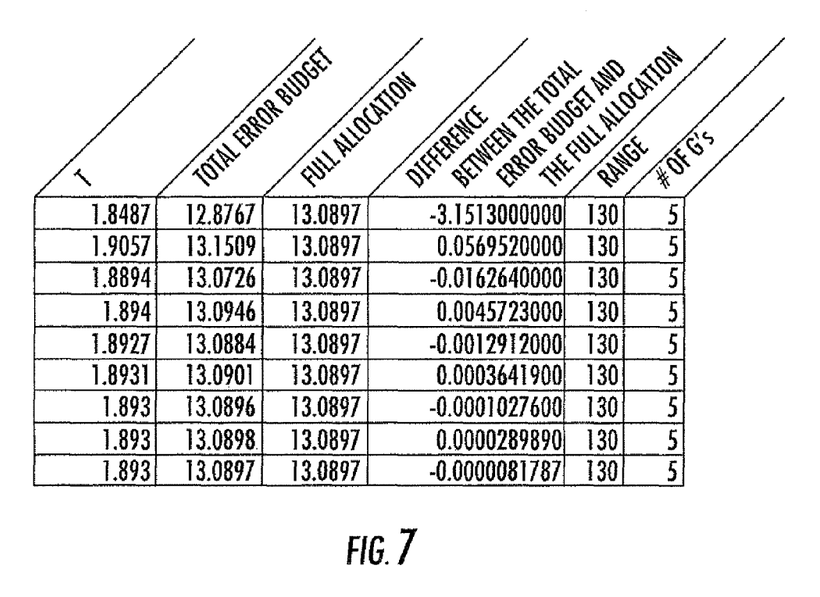
FIG. 7 is a table listing the results of calculations according to the method of the invention for the conditions set forth in conjunction with FIG. 6.

FIG. 7 illustrates a table showing the results of iterative calculations according to an aspect of the invention. In FIG. 7, the earliest iterations appear at the top of the table, and values of T in the first column converge toward the bottom of the table to a value of 1.893 in the successive iterations. The second column represents the current value of Total Error Budget ($n\sigma_p+b_p$), and the third column represents the current value of the Full Allocation of the Error (k*BW). Thus, at a range of 130 km and for 5 G's of acceleration of the target, it takes 9 iterations to converge to the desired accuracy of 0.00001 between the Total Error Budget ($n\sigma_p+b_p$) and the Full Allocation of the Error (k*BW), to give us a radar revisit time of 1.893 seconds. Since the method consumes the entire allocation of the error, the Radar Revisit Time (T) (1.893 seconds in this example) determined by this method is the largest T which makes least frequent revisits to the radar to keep this target in track. This, in turn, results in saving resources which are now free for other functions or for tracking additional targets.

A method according to an aspect of the invention is for determining the timing of radar tracking pulses (13) in a pulsed radar system (10) operable in at least a tracking mode, and having known or predetermined radar beamwidth. The method comprises the steps of operating the radar, and sensing or determining the radar range (r) of the target (22) and the angle accuracy ($\sigma_m$) in the tracking mode. The bias error ($b_p$) attributable to maneuver of the sensed target, random error ($\sigma_p$) in sensed target angle, and probability of containment (n) of the cumulative or total error are determined. From the bias error ($b_p$), random error ($\sigma_p$), and probability of containment (n), that value of tracking refresh or update rate (T) for the sensed target is determined which makes the sum of (a) the bias error ($b_p$) and (b) the multiplicative product of the random error ($\sigma_p$) multiplied by a number associated with the containment probability (n) of the total error (c) to form a result ($n\sigma_p+b_p$) which is equal to a predetermined fraction (kBW) of the radar beamwidth. In a particular mode of this method, the predetermined fraction (½*BW) of the radar beamwidth is one-half. The tracking pulse refresh or update rate (T) is applied to establish the interval between refresh or update tracking pulses.

A method according to another aspect of the invention is for selection of the timing (T) between successive tracking pulses in a radar system (10) which is tracking, with the aid of a Kalman filter (20k), a target (22) having acceleration (A) and at a range (r), where the radar system (10) has a beamwidth (BW) at a given relative fractional power level (k), and standard deviation of the measurement error ($\sigma_m$). The method comprises the steps of calculating (414) the Kalman filter (20k) lag time $\tau$ which minimizes target velocity, and determining (416) a nonlinear equation F(T) and (418) its derivative F'(T) with respect to T. Using an iterative Newton-Raphson numeric method (450), the value of radar tracking pulse time interval T is determined (422) to within a predetermined accuracy. Radar tracking pulses are transmitted (13) toward the target (22) at the calculated value of radar tracking pulse time interval T. In a particular mode of this method, the step of calculating the Kalman filter lag time $\tau$ which minimizes target velocity comprises the step of calculating $$\tau = T^{\left(\frac{1}{5}\right)} * \left(\frac{3n\sigma_m}{2A}\right)^{\left(\frac{2}{5}\right)} \text{ where:}$$

where:
n is a number associated with the probability of containment;
$\sigma_m$ is random error in sensed or measured target angle;
A is the target acceleration; and
* represents multiplication.

In another particular mode of this method, the step (416, 418) of determining a nonlinear equation F(T) and its derivative F'(T) with respect to T includes the steps (a) of calculating:

$$F(T) = n * \left(\frac{\left(1-\left(\frac{a}{b}\right)^2\right)}{\left(\frac{a}{b}\right)^2}\right)^{1/2} * \sigma_m + \frac{AT^2}{2\left(\frac{T}{b}\right)^2} - kBW = 0 \text{ where:}$$

$$a = T^{\frac{1}{5}} * \left(\frac{3n\sigma_m}{2A}\right)^{\frac{2}{5}} \text{ and}$$

$$b = a + T = T^{(1/5)} * \left(\frac{3n\sigma_m}{2A}\right)^{2/5} + T$$

(b) calculating F'(T); and
(c) iteratively applying the Newton-Raphson method (450) for determining the value of radar tracking pulse time T to within a desired accuracy.

A method according to a further aspect of invention is for determining the timing of radar tracking pulses (13) in a pulsed radar system (10) operable in at least a tracking mode. The method comprises the steps of operating the radar, and sensing or determining the radar range (r) of the target (22) and the angle accuracy ($\sigma_m$) in the tracking mode, and having known the radar beamwidth. The bias error ($b_p$) attributable to maneuver of the sensed target, random error ($\sigma_p$) in sensed target angle, and probability of containment (n) of the cumulative or total error are determined. From the bias error, random error, and probability of containment, that value of tracking refresh rate for the sensed target is determined which makes a sum equal to a predetermined fraction of the radar beamwidth, where the sum is the sum of the bias error and a multiplicative product, and where the multiplicative product is the product of the random error multiplied by a number associated with the containment probability of the total error.

What is claimed is:
1. A method for determining timing of radar tracking pulses in a pulsed radar system operable in at least a tracking mode, and having known radar beamwidth, said method comprising the steps of:
determining a radar range of the target and an angle accuracy in the tracking mode;
determining bias error attributable to a maneuver of said target, random error in a sensed target angle, and probability of containment of a cumulative error, where the cumulative error comprises a combination of the error attributable to a maneuver and the random error;
from said bias error, random error, and probability of containment, determining a value of tracking refresh rate for the target which makes a sum of said bias error and a product of said random error multiplied by a number associated with the containment probability of the cumulative error equal to a predetermined fraction of said known radar beamwidth.

2. A method according to claim 1, wherein said step of determining a value of tracking refresh rate for the target comprises the step of determining a value of tracking refresh rate for a target which makes the sum of said bias error and said random error along said bias error and the product of said random error multiplied by a number associated with the containment probability of the cumulative error equal to one-half said known radar beamwidth.

3. A method for selection of the timing between successive tracking pulses in a radar system tracking, with the aid of a Kalman filter, a target having acceleration A and at a range r, where the radar system has a beamwidth BW at a given relative fractional power level k, and standard deviation of the measurement error $\sigma_m$, said method comprising the steps of:

calculating lag time $\tau$ of the Kalman filter which minimizes target velocity, and determining a nonlinear equation F(T) and its derivative F'(T) with respect to a radar tracking pulse time interval T;

using an iterative Newton-Raphson numeric method, determining the value of radar tracking pulse time interval T, to within a predetermined accuracy; and transmitting radar tracking pulses toward the target at the calculated value of radar tracking pulse time interval T.

4. A method according to claim 3, wherein said step of calculating the Kalman filter lag time $\tau$ which minimizes target velocity, comprises the step of calculating $$\tau = T^{\left(\frac{1}{5}\right)} * \left(\frac{3n\sigma_m}{2A}\right)^{\left(\frac{2}{5}\right)} \text{ where:}$$

where:
n is the probability of containment;
A is the target acceleration; and
* represents multiplication.

5. A method according to claim 3, wherein said step of determining a nonlinear equation F(T) and its derivative F'(T) with respect to T includes the steps (a) of calculating:

$$F(T) = n * \left(\frac{\left(1 - \left(\frac{a}{b}\right)^2\right)}{\left(\frac{a}{b}\right)^2}\right)^{1/2} * \sigma_m + \frac{AT^2}{2\left(\frac{T}{b}\right)^2} - kBW = 0 \text{ where:}$$

$$a = T^{\frac{1}{5}} * \left(\frac{3n\sigma_m}{2A}\right)^{\frac{2}{5}} \text{ and}$$

and:
kBW is fraction of radar beamwidth;
A is target acceleration;
n is probability of containment;
$\sigma_m$ is angle accuracy; and $$b = a + T = T^{(1/5)} * \left(\frac{3n\sigma_m}{2A}\right)^{2/5} + T$$

(b) calculating F(T); and
(c) iteratively applying the Newton-Raphson method for determining the value of radar tracking pulse time T to within a desired accuracy.

6. A method for determining the timing of radar tracking pulses in a pulsed radar system operable in at least a tracking mode and having known or predetermined radar beamwidth, said method comprising the steps of:

determining a radar range of the target and an angle accuracy in the tracking mode;

determining bias error attributable to a maneuver of the target, a random error in sensed target angle, and a probability of containment of cumulative error;

from said bias error, random error, and probability of containment, determining a value of tracking refresh rate for the target which makes a sum equal to a predetermined fraction of said radar beamwidth, where said sum is a sum of said bias error and a multiplicative product, and said multiplicative product is a product of said random error multiplied by a number associated with the containment probability of the cumulative error.

7. A system for determining timing of radar tracking pulses in a pulsed radar system operable in at least a tracking mode, and having known radar beamwidth, comprising a processor executing instructions to perform the following steps:

determining a radar range of the target and an angle accuracy in the tracking mode;

determining bias error attributable to a maneuver of said target, random error in a sensed target angle, and probability of containment of a cumulative error, where the cumulative error comprises a combination of the error attributable to a maneuver and the random error;

from said bias error, random error, and probability of containment, determining a value of tracking refresh rate for the target which makes a sum of said bias error and a product of said random error multiplied by a number associated with the containment probability of the cumulative error equal to a predetermined fraction of said known radar beamwidth.

8. A system according to claim 7, wherein, said step of determining a value of tracking refresh rate for the target comprises the step of determining a value of tracking refresh rate for a target which makes the stun of said bias error and said random error along said bias error and the product of said random error multiplied by a number associated with the containment probability of the cumulative error equal to one-half said known radar beamwidth.

9. A system for selection of the timing between successive tracking pulses in a radar system tracking, with the aid of a filter, a target having acceleration A and at a range r, where the radar system has a beamwidth BW at a given relative fractional power level k, and standard deviation of the measurement error $\sigma_m$, said system comprising:

a processor executing instructions for performing the steps of calculating lag time $\tau$ of the filter which minimizes target velocity, and determining a nonlinear equation F(T) and its derivative F'(T) with respect to a radar tracking pulse time interval T;

using an iterative Newton-Raphson numeric method, determining the value of radar tracking pulse time interval T, to within a predetermined accuracy; and transmitting radar tracking pulses toward the target at the calculated value of radar tracking pulse time interval T.

10. A system according to claim 9, wherein the filter comprises a Kalman filter.

11. A system according to claim 9, wherein said step of calculating the filter lag time $\tau$ which minimizes target velocity comprises the further step of calculating $$\tau = T^{\left(\frac{1}{5}\right)} * \left(\frac{3n\sigma_m}{2A}\right)^{\left(\frac{2}{5}\right)} \text{ where:}$$

where:
  n is the probability of containment;
  A is the target acceleration; and
  * represents multiplication.

12. A system according to claim 9, wherein said step of determining a nonlinear equation F(T) and its derivative F'(T) with respect to T includes the steps:
  (a) of calculating:

$$F(T) = n * \left(\frac{\left(1 - \left(\frac{a}{b}\right)^2\right)}{\left(\frac{a}{b}\right)^2}\right)^{1/2} * \sigma_m + \frac{AT^2}{2\left(\frac{T}{b}\right)^2} - kBW = 0 \text{ where:}$$

-continued $$a = T^{\frac{1}{5}} * \left(\frac{3n\sigma_m}{2A}\right)^{\frac{2}{5}} \text{ and}$$

and:
  kBW is fraction of radar beamwidth;
  A is target acceleration;
  n is probability of containment;
  $\sigma_m$ is angle accuracy;
and $$b = a + T = T^{(1/5)} * \left(\frac{3n\sigma_m}{2A}\right)^{2/5} + T$$

(b) calculating F(T); and
  (c) iteratively applying the Newton-Raphson method for determining the value of radar tracking pulse time T to within a desired accuracy.

\* \* \* \* \*